(12) United States Patent
Horinouchi

(10) Patent No.: US 12,742,667 B2
(45) Date of Patent: Sep. 22, 2026

(54) FLOW RATE CALCULATION DEVICE AND FLOW RATE CALCULATION METHOD

(71) Applicant: HORIBA STEC, Co., Ltd., Kyoto (JP)

(72) Inventor: Osamu Horinouchi, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 288 days.

(21) Appl. No.: 18/770,538

(22) Filed: Jul. 11, 2024

(65) Prior Publication Data

US 2025/0020495 A1 Jan. 16, 2025

(30) Foreign Application Priority Data

Jul. 12, 2023 (JP) ................................ 2023-114362

(51) Int. Cl.

*G01F 1/36* (2006.01)
*G01F 1/34* (2006.01)
*G01F 1/56* (2006.01)
*G01F 15/06* (2022.01)
*G01F 1/40* (2006.01)
*G01F 15/00* (2006.01)

(52) U.S. Cl.

CPC ................. *G01F 1/36* (2013.01); *G01F 1/34* (2013.01); *G01F 1/363* (2013.01); *G01F 1/56* (2013.01); *G01F 15/06* (2013.01); *G01F 1/40* (2013.01); *G01F 15/005* (2013.01)

(58) Field of Classification Search

CPC ... G01F 1/36; G01F 1/34; G01F 1/363; G01F 1/40; G01F 1/56; G01F 15/06; G01F 15/005

See application file for complete search history.

(56) References Cited

U.S. PATENT DOCUMENTS 8,746,032 B1 * 6/2014 Feller ........................ G01F 5/00 73/1.35
2009/0112491 A1 * 4/2009 Nakada .................. G01F 25/17 702/183
2010/0080262 A1 * 4/2010 McDonald ............... G01F 5/00 374/166
2017/0370763 A1 * 12/2017 Brashear .................. G01F 1/86
2018/0172491 A1 6/2018 Ding et al.

FOREIGN PATENT DOCUMENTS

WO 2018111725 A1 6/2018

* cited by examiner

*Primary Examiner* — Benjamin R Schmitt
(74) *Attorney, Agent, or Firm* — Alleman Hall LLP

(57) ABSTRACT

A flow rate calculation device includes: a specific flow path and a bypass flow path which are provided to branch from a main flow path; a first fluid resistance element which is provided in the specific flow path; a second fluid resistance element which is provided in the bypass flow path; a container which is arranged in the specific flow path; a pressure sensor which detects a pressure in the container; and a flow rate calculation unit. The flow rate calculation unit calculates the flow rate of a first branch fluid diverted to the specific flow path based on a change in the pressure in the container, and calculates the flow rate of the fluid flowing through the main flow path based on the calculated flow rate of the first branch fluid and a diversion ratio determined according to the first fluid resistance element and the second fluid resistance element.

11 Claims, 7 Drawing Sheets

1
COM
PU
L3
V2
V1
T
CV
TA
P2
P3
RE2, PL2
F2
RE1, PL1
F1
L2
T0
L1
P1
L0
100
F

1
COM
PU
L3
V2
V1
T
CV
UR
P4
TA
P2
P3
RE2,
PL2
F2
RE1,
PL1
F1
L2
L1
T0
L0
P1
100
F

FLOW RATE CALCULATION DEVICE AND FLOW RATE CALCULATION METHOD

INCORPORATION BY REFERENCE

This application is based upon and claims the benefit of priority from the corresponding Japanese Patent Application No. 2023-114362 (filed on Jul. 12, 2023), the entire contents of which are incorporated herein by reference.

BACKGROUND

The present invention relates to a flow rate calculation device and a flow rate calculation method.

Conventionally, as a method for measuring the flow rate of a fluid, a RoR (Rate of Rise) method is known. The RoR method is a method in which a fluid (for example, a gas) is caused to flow from a test object (for example, a flow rate control device) into an evacuated container, and a flow rate is determined from the rate of pressure increase in the container using a state equation for fluid. For example, International Publication No. WO2018/111725 discloses a device for verifying the flow rate of a fluid using the RoR method.

However, when the RoR method is utilized, as the flow rate of a fluid to be verified is increased, it is necessary to prepare a larger (higher-capacity) container, with the result that the size of the entire device is increased.

SUMMARY

The present invention is made to solve the problem described above, and an object of the present invention is to provide a flow rate calculation device and a flow rate calculation method which can calculate, even when the flow rate of a fluid is high, the flow rate of the fluid while avoiding an increase in the size of the entire device.

A flow rate calculation device according to an aspect of the present invention is a flow rate calculation device that calculates a flow rate of a fluid flowing through a main flow path, and includes: a specific flow path and a bypass flow path which are provided to branch from the main flow path and to which the fluid is diverted; a first fluid resistance element that is provided in the specific flow path; a second fluid resistance element that is provided in the bypass flow path; a container that is arranged on a downstream side of the first fluid resistance element in the specific flow path; a pressure sensor that detects a pressure in the container; and a flow rate calculation unit that calculates a flow rate of a first branch fluid diverted to the specific flow path based on a change in the pressure in the container, and calculates the flow rate of the fluid flowing through the main flow path based on the calculated flow rate of the first branch fluid and a diversion ratio determined according to the first fluid resistance element and the second fluid resistance element.

A flow rate calculation method according to another aspect of the present invention includes: a step of calculating, when a fluid flowing through a main flow path is diverted to a specific flow path and a bypass flow path that are provided to branch from the main flow path, a flow rate of a first branch fluid flowing through the specific flow path based on a change in a pressure in a container arranged on a downstream side of a first fluid resistance element in the specific flow path; and a step of calculating a flow rate of the fluid flowing through the main flow path based on the calculated flow rate of the first branch fluid and a diversion ratio determined according to the first fluid resistance element and a second fluid resistance element provided in the bypass flow path.

Further objects of the present invention and specific advantages obtained by the present invention will become clearer from the following description of an embodiment.

DETAILED DESCRIPTION

An exemplary embodiment of the present invention will be described below with reference to drawings. In the following description, with respect to any constituent element of a flow rate calculation device, a side into which a fluid flows is also referred to as an upstream side or a primary side, and with respect to the constituent element, a side from which the fluid flows out is also referred to as a downstream side or a secondary side.

[1. Configuration of Flow Rate Calculation Device]

Figure 1:
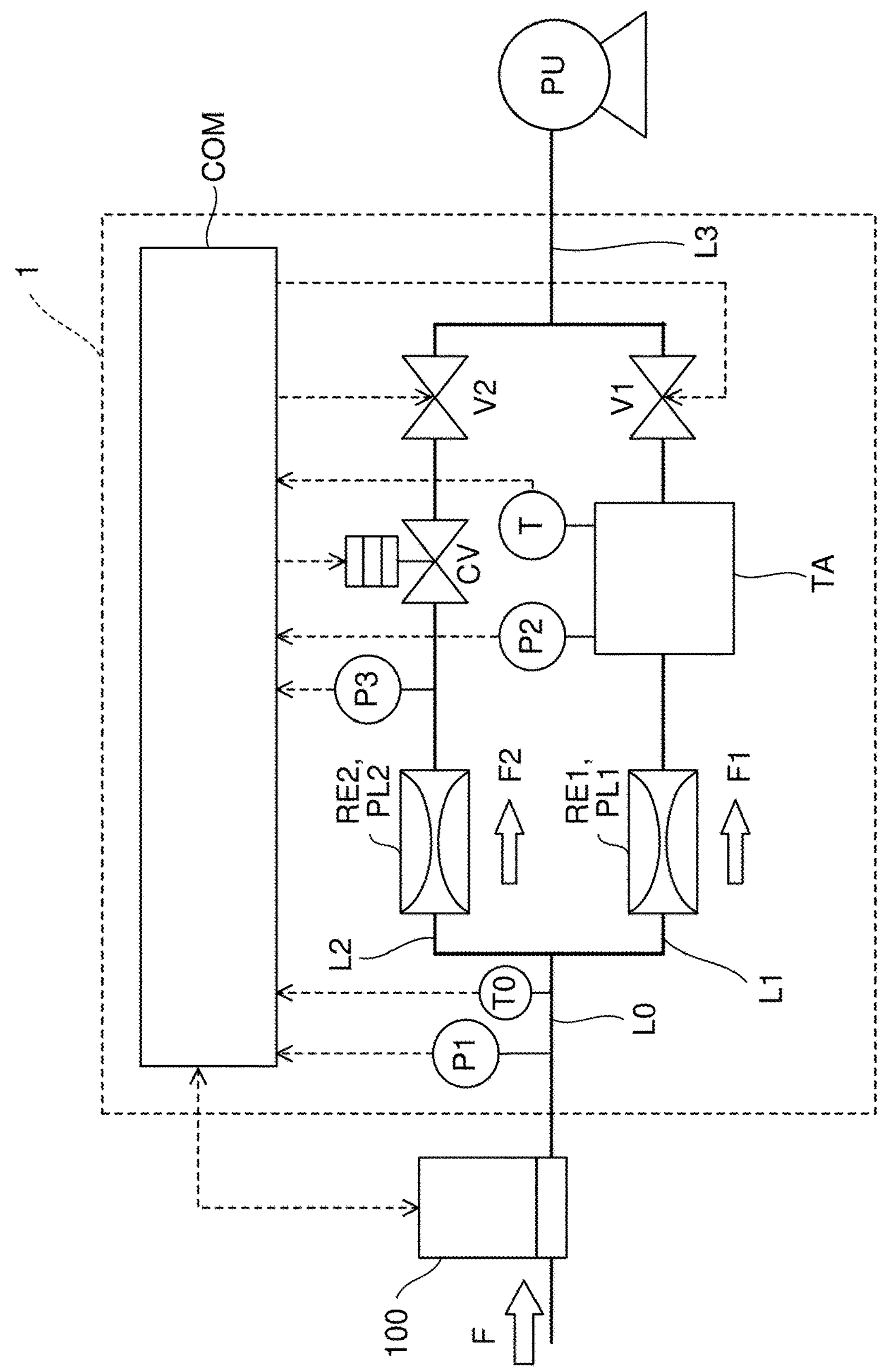
FIG. 1 is an illustrative view showing a schematic configuration of a flow rate calculation device according to an embodiment of the present invention.

FIG. 1 is an illustrative view showing a schematic configuration of a flow rate calculation device 1 according to the present embodiment. The flow rate calculation device 1 uses a method to be described later to calculate the flow rate of a fluid F which is discharged from a flow rate control device 100 and flows through a main flow path L0. Then, the flow rate calculation device 1 diagnoses the flow rate control device 100 based on the calculated flow rate and a set flow rate for the fluid F discharged by the flow rate control device 100, and performs calibration as necessary. As the fluid F described above, for example, a material gas used for a semiconductor manufacturing process can be assumed.

The flow rate control device 100 is a device which discharges the fluid F into the main flow path L0, and is a device which a target to be diagnosed by the flow rate calculation device 1 (Device Under Test). Although the flow rate control device 100 is formed with, for example, a mass flow controller which controls the flow rate of the fluid F, the present invention is not limited to this example.

The flow rate calculation device 1 includes a specific flow path L1 and a bypass flow path L2. The specific flow path L1 and the bypass flow path L2 are provided to branch from the main flow path L0. The fluid F which is discharged from the flow rate control device 100 into the main flow path L0 is diverted to the specific flow path L1 and the bypass flow path L2. In the present specification, the "diversion" indicates that a fluid is separated to flow. In the following description, a fluid which is diverted from the main flow path L0 to the specific flow path L1 is also referred to as a first branch fluid F1, and a fluid which is diverted from the main flow path L0 to the bypass flow path L2 is also referred to as a second branch fluid F2. In other words, the fluid F is separated into the first branch fluid F1 and the second branch fluid F2 at the branch point of the specific flow path L1 and the bypass flow path L2, and thereafter the first branch fluid F1 and the second branch fluid F2 flow through the specific flow path L1 and the bypass flow path L2, respectively.

The specific flow path L1 and the bypass flow path L2 merge on the downstream side of a container TA which is arranged in the specific flow path L1 and will be described later, and are connected to a merge line L3. The merge line L3 is connected to a pump PU. Hence, the bypass flow path L2 is provided between the main flow path L0 and the merge line L3 to bypass the container TA in the specific flow path L1.

The flow rate calculation device 1 further includes a first fluid resistance element RE1 and a second fluid resistance element RE2. The first fluid resistance element RE1 is provided in the specific flow path L1. The second fluid resistance element RE2 is provided in the bypass flow path L2.

Figure 2:
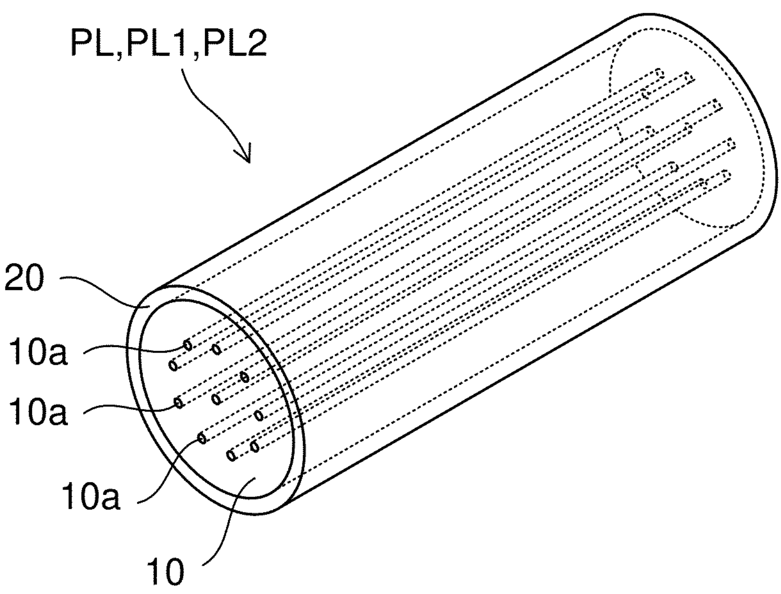
FIG. 2 is a perspective view showing an example of the configuration of a pressure loss element.

Each of the first fluid resistance element RE1 and the second fluid resistance element RE2 is formed with, for example, a pressure loss element PL (see FIG. 2). The pressure loss element PL indicates an element which provides a pressure loss (energy loss) to a fluid. The first fluid resistance element RE1 is provided in the specific flow path L1 to provide a pressure loss to the first branch fluid F1 flowing through the specific flow path L1. The second fluid resistance element RE2 is provided in the bypass flow path L2 to provide a pressure loss to the second branch fluid F2 flowing through the bypass flow path L2.

For example, when flow pass resistance is generated, a pressure loss is provided to a fluid. When a pressure loss is provided to a fluid, for example, the flow rate of the fluid is lowered under the same pressure condition. Hence, the pressure loss element PL functions as an element which restricts the flow rate, that is, as a fluid resistance element serving as resistance to the flow of the fluid. In the following description, the pressure loss element PL of the first fluid resistance element RE1 is also referred to as a first pressure loss element PL1, and the pressure loss element PL of the second fluid resistance element RE2 is also referred to as a second pressure loss element PL2.

FIG. 2 is a perspective view showing an example of the configuration of the pressure loss element PL. The pressure loss element PL includes a flow path forming member 10 and a cover member 20. The cover member 20 is preferably provided as necessary.

The flow path forming member 10 is formed of ceramics such as quartz, alumina, zirconia or silicon nitride, and is formed in a cylindrical shape. The flow path forming member 10 includes at least one flow path 10*a* (hereinafter also referred to as a resistance flow path 10*a*) which serves as resistance. The resistance flow path 10*a* penetrates the flow path forming member 10 in an axial direction, and is formed in the shape of a circle in cross section. When the cover member 20 is provided, the cover member 20 is formed of a metal whose hardness is lower than that of at least ceramics such as stainless steel or a nickel-based alloy. The pressure loss element PL as described above is also referred to as a ceramic restrictor because the pressure loss element PL is a restrictor which is formed of at least ceramics.

The flow path resistance of the pressure loss element PL is determined based on an aspect ratio and the number of resistance flow paths 10*a*. The aspect ratio indicates the ratio of the length of the resistance flow path 10*a* in the axial direction to the radius thereof. Hence, when the aspect ratio of the resistance flow path 10*a* is set constant, the number of resistance flow paths 10*a* is changed, and thus it is possible to easily adjust the flow path resistance of the pressure loss element PL. Therefore, the number of resistance flow paths 10*a* is changed, and thus it is possible to easily adjust the flow rate of the fluid flowing through the pressure loss element PL.

Figure 3:
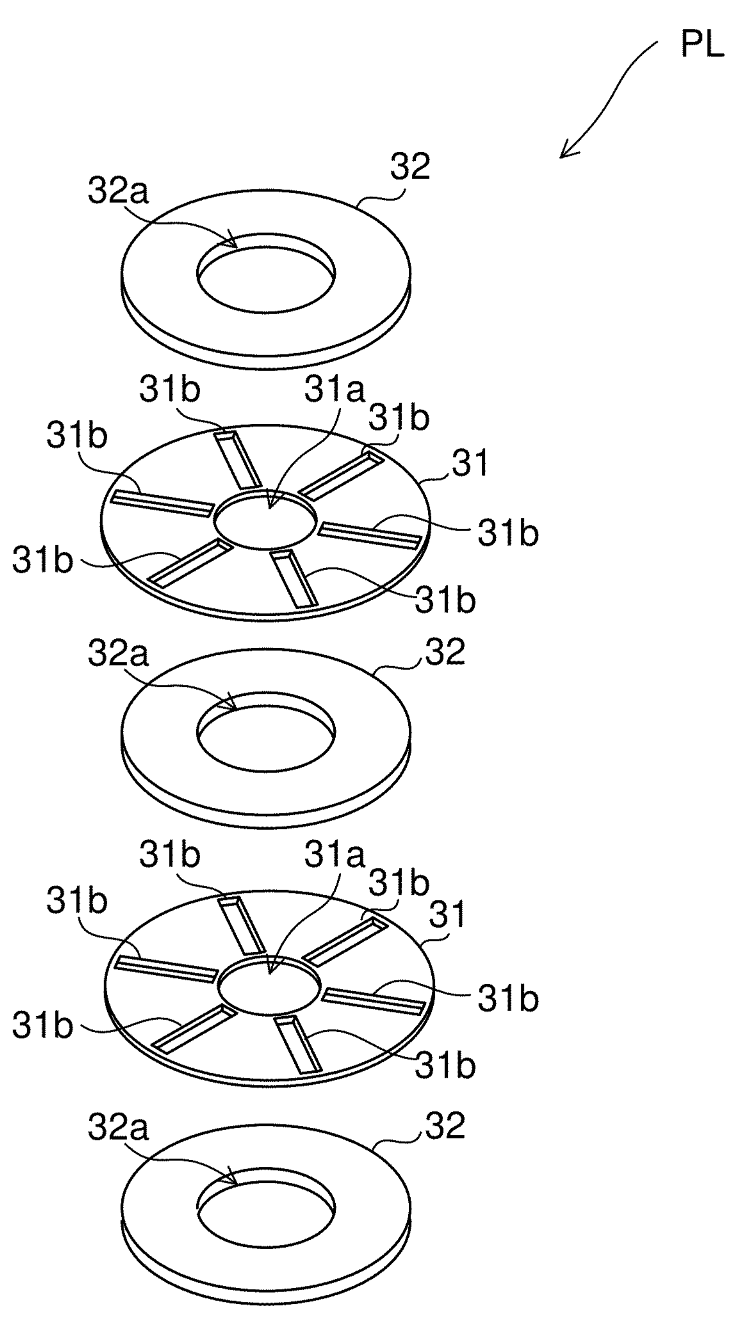
FIG. 3 is an exploded perspective view showing another example of the configuration of the pressure loss element.

A fluid resistance element (flow restrictor) which is used in a differential pressure type flow rate control device (mass flow controller) can also be preferably used as the pressure loss element PL. FIG. 3 is an exploded perspective view showing a schematic configuration of a flow restrictor which serves as another example of the configuration of the pressure loss element PL.

The flow restrictor is an element which generates a pressure difference (differential pressure) between two pressure sensors included in the mass flow controller. As shown in the figure, the flow restrictor has a structure in which circular slit plates 31 and circular slit cover plates 32 are alternately stacked. Each of the slit plate 31 and the circular slit cover plate 32 is formed of a metal such as a stainless steel (Steel Use Stainless). In other words, the flow restrictor is a restrictor which is formed of a metal.

The slit plate 31 includes a first through hole 31*a* which penetrates a center portion in a thickness direction and a plurality of slits 31*b* which are formed radially from the center portion. The slit cover plate 32 includes a second through hole 32*a* which penetrates the center portion in the thickness direction. The outside diameter of the slit cover plate 32 is smaller than that of the slit plate 31, and the inside diameter thereof is larger than that of the slit plate 31.

The slit plate 31 and the slit cover plate 32 are stacked, and thus the inner end of the slit 31*b* serves as the start end of the resistance flow path, and the outer end of the slit 31*b* serves as the terminal end of the resistance flow path. With the first through holes 31*a* of the slit plates 31 and the second through holes 32*a* of the slit cover plates 32, a through hole which penetrates along a stacking direction is formed in the center portion of the flow restrictor. The through hole serves as a fluid introduction portion.

The number of slit plates 31 and slit cover plates 32 stacked is changed, and thus the number of resistance flow paths described above is changed. Hence, as in the case of the ceramic restrictor, the number of slit plates 31 and slit cover plates 32 stacked is changed, and thus it is possible to easily adjust the flow rate of the fluid flowing through the flow restrictor.

The pressure loss element PL is not limited to the ceramic restrictor and the flow restrictor described above. It is preferable to provide a pressure loss to a fluid to restrict the flow rate of the fluid, and in this regard, even an element such as an aperture (orifice) can be used as the pressure loss element PL.

As shown in FIG. 1, the flow rate calculation device 1 further includes a main flow path pressure sensor P1, the container TA, a specific flow path pressure sensor P2, a temperature sensor T, a bypass flow path pressure sensor P3, a control valve CV, a first opening/closing valve V1 and a second opening/closing valve V2.

The main flow path pressure sensor P1 (main flow path pressure detection unit) measures the pressure of the fluid flowing through the main flow path L0. The container TA is a tank which is arranged on the downstream side of the first fluid resistance element RE1 in the specific flow path L1. The first branch fluid F1 flowing through the specific flow path L1 flows into the container TA. The specific flow path pressure sensor P2 detects a pressure in the container TA.

The temperature sensor T detects a gas temperature in the container TA. When the gas temperature in the container TA is equal to the temperature of the outer wall surface or the inner wall surface of the container TA, the temperature sensor T may detect the temperature of the outer wall surface or the inner wall surface of the container TA.

The bypass flow path pressure sensor P3 is arranged on the downstream side of the second fluid resistance element RE2 in the bypass flow path L2, and measures the pressure of the second branch fluid F2 flowing via the second fluid resistance element RE2. The control valve CV is provided to control the flow rate of the second branch fluid F2 flowing through the bypass flow path L2 via the second fluid resistance element RE2. Although the control valve CV is formed with, for example, a solenoid proportional valve, the control valve CV may be formed with another valve (flow rate control valve).

The first opening/closing valve V1 is located on the downstream side of the container TA in the specific flow path L1, and opens and closes the flow path. The second opening/closing valve V2 is located on the downstream side of the second fluid resistance element RE2, in particular, on the downstream side of the control valve CV in the bypass flow path L2, and opens and closes the flow path. Although each of the first opening/closing valve V1 and the second opening/closing valve V2 is formed with, for example, a pneumatic valve, it may be formed with another valve.

The flow rate calculation device 1 further includes a control computation device COM. The control computation device COM is formed with, for example, a computer which includes a central processing unit (CPU). The control computation device COM performs various types of computation based on detection signals output from instruments (the main flow path pressure sensor P1, the specific flow path pressure sensor P2, the temperature sensor T and the bypass flow path pressure sensor P3) included in the flow rate calculation device 1, and controls the valves (the control valve CV, the first opening/closing valve V1 and the second opening/closing valve V2) included in the flow rate calculation device 1.

Figure 4:
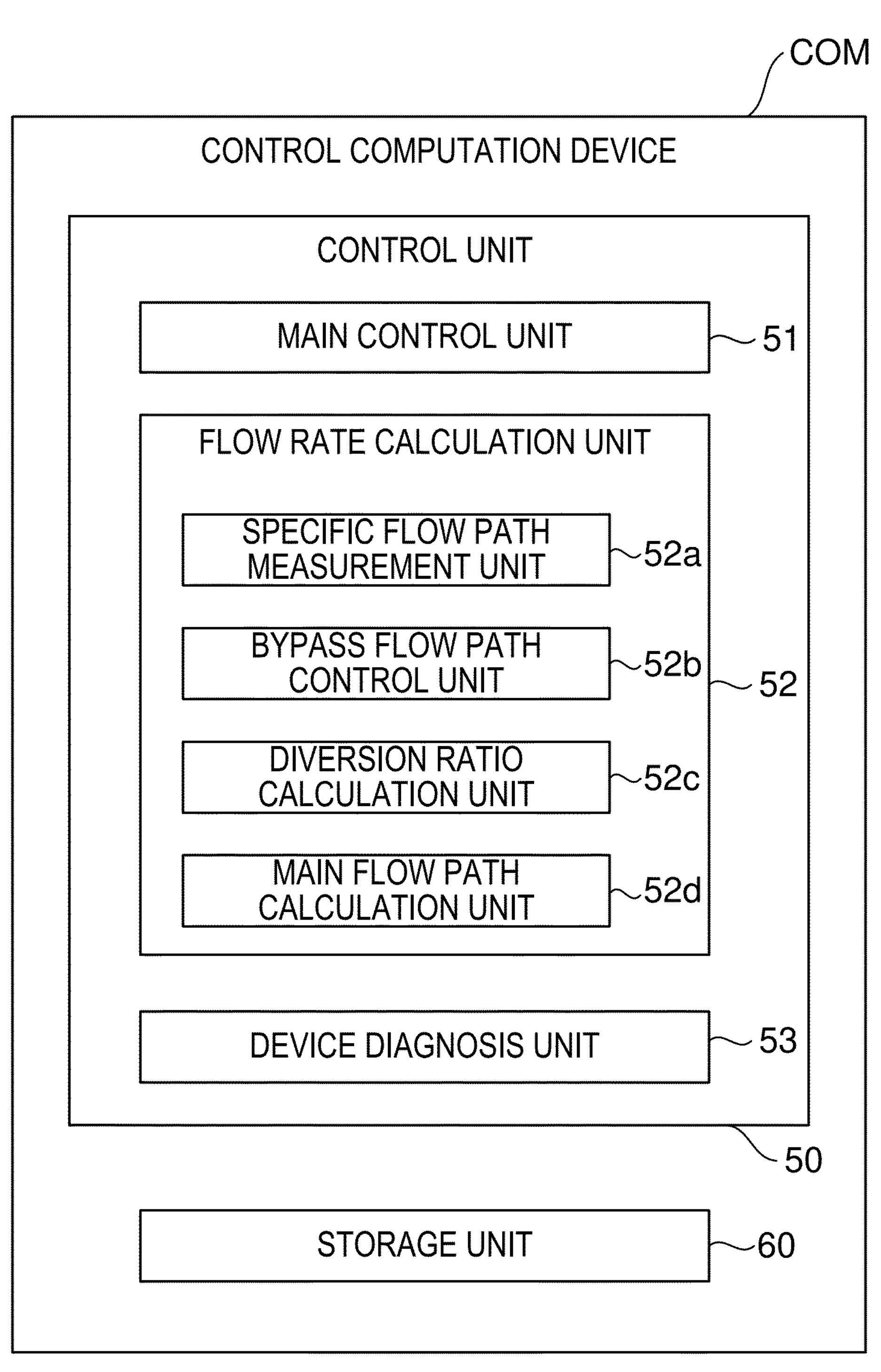
FIG. 4 is a block diagram showing the detailed configuration of a control computation device.

FIG. 4 is a block diagram showing the detailed configuration of the control computation device COM. The control computation device COM includes a control unit 50 and a storage unit 60. Although the control computation device COM further includes an input unit (for example, a keyboard, a mouth or a touch panel), a display unit (for example, a liquid crystal display device), a communication unit (for example, a connector or an adaptor) and the like, the input unit and the like are not essential in the present embodiment, and thus the input unit and the like are omitted in FIG. 4.

The control unit 50 includes a main control unit 51, a flow rate calculation unit 52 and a device diagnosis unit 53. The main control unit 51 controls the operations of the individual units of the control computation device COM, and outputs control signals for controlling the valves in the flow rate calculation device 1.

The flow rate calculation unit 52 calculates the flow rate of the fluid F flowing through the main flow path L0 based on the detection signals output from the instruments in the flow rate calculation device 1. Specifically, the flow rate calculation unit 52 includes a specific flow path measurement unit 52*a*, a bypass flow path control unit 52*b*, a diversion ratio calculation unit 52*c* and a main flow path calculation unit 52*d*.

The specific flow path measurement unit 52*a* uses the RoR method to measure the flow rate of the first branch fluid F1 diverted to the specific flow path L1. The bypass flow path control unit 52*b* controls the control valve CV arranged in the bypass flow path L2. The diversion ratio calculation unit 52*c* calculates the diversion ratio based on the ratio between the flow rate of the first branch fluid F1 diverted from the main flow path L0 to the specific flow path L1 and the flow rate of the second branch fluid F2 diverted from the main flow path L0 to the bypass flow path L2. The main flow path calculation unit 52*d* uses the flow rate of the first branch fluid F1 and the diversion ratio to calculate the flow rate of the fluid F flowing through the main flow path L0. The details of a method for calculating the flow rates described above will be described later.

The device diagnosis unit 53 diagnoses the flow rate control device 100 which discharges the fluid F into the main flow path L0. The flow rate control device 100 may not be able to control the flow rate according to the set flow rate due to aging, clogging of the flow path, some failure or the like. Hence, the device diagnosis unit 53 periodically diagnoses whether the flow rate control device 100 can control the flow rate according to the set flow rate based on the flow rate calculated by the flow rate calculation unit 52.

The storage unit 60 is a memory which stores operation programs for the control unit 50, and also stores various types of information (detected measurement values) included in the detection signals output from the instruments in the flow rate calculation device 1, information on the first fluid resistance element RE1 and the second fluid resistance element RE2 (for example, information on the number of resistance flow paths) and the like. The storage unit 60 as described above can be formed with, for example, a hard disk, an SSD (solid state drive), an optical disk, a magnetic disk, a nonvolatile memory or the like.

As shown in FIG. 1, the flow rate calculation device 1 further includes a main flow path thermometer TO. The main flow path thermometer TO measures the temperature of the fluid F flowing through the main flow path L0. The main flow path thermometer TO is provided to acquire temperature information necessary for computation in the RoR method when the flow rate of the fluid F flowing through the main flow path L0 is corrected. The correction of the flow rate will be described in "4. Supplemental information" to be described later. Although strictly speaking, when the flow rate is corrected, information on a temperature and a pressure on the upstream side of the first fluid resistance element RE1 in the specific flow path L1 and on a temperature and a pressure on the upstream side of the second fluid resistance element RE2 in the bypass flow path L2 is needed, as the information described above, the detection value (pressure Pr1) of the main flow path pressure sensor P1 and the detection value of the main flow path thermometer TO can be used instead.

[2. About Flow Rate Calculation Method]

Figure 5:
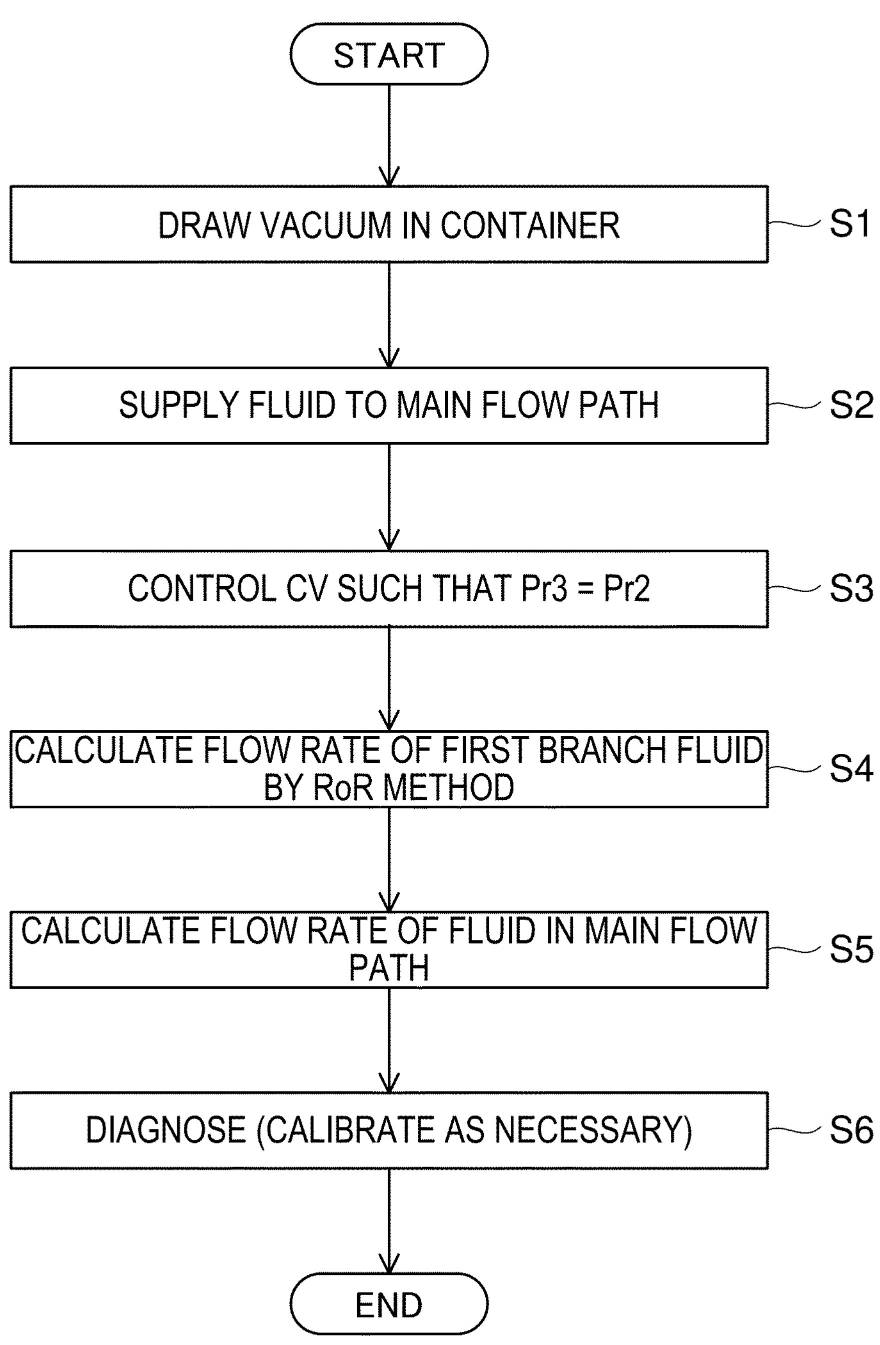
FIG. 5 is a flowchart showing the flow of steps in a flow rate calculation method.

FIG. 5 is a flowchart showing the flow of steps in a flow rate calculation method according to the present embodiment. The flow rate calculation method according to the present embodiment will be described below with reference to FIGS. 1 to 5. An example where flow restrictors are used as the first fluid resistance element RE1 and the second fluid resistance element RE2 will be described below. Even when ceramic restrictors are used as the first fluid resistance element RE1 and the second fluid resistance element RE2, the flow rate calculation method described below can be applied.

(S1; Vacuum Drawing Step)

Both the first opening/closing valve V1 and the second opening/closing valve V2 are first opened, the pump PU is driven and thus a vacuum is drawn until a set pressure in the container TA is reached. Although here, the discharge of the fluid F from the flow rate control device 100 into the main flow path L0 is stopped, a vacuum may be drawn while the fluid F is being discharged. It is not necessary to achieve a strict vacuum in the container TA. In other words, the set pressure described above is preferably high enough to allow computation of the rate of pressure increase using the RoR method to be described later.

(S2; Fluid Supply Step)

Then, the fluid F at the set flow rate Q0 is discharged from the flow rate control device 100 into the main flow path L0. Since the first opening/closing valve V1 and the second opening/closing valve V2 are opened, the fluid F is diverted to the specific flow path L1 and the bypass flow path L2. After the flow rate of the first branch fluid F1 is stabilized, the first opening/closing valve V1 is closed. The second opening/closing valve V2 remains open.

(S3; CV Control Step)

The first opening/closing valve V1 is closed in S2, and thus the first branch fluid F1 is discharged into the container TA. In this way, the pressure in the container TA is increased. Here, the flow rate calculation unit 52 (in particular, the bypass flow path control unit 52*b*) controls the control valve CV such that a pressure Pr3 on the downstream side of the second fluid resistance element RE2 which is measured by the bypass flow path pressure sensor P3 matches or approaches a pressure Pr2 in the container TA which is detected by the specific flow path pressure sensor P2.

By the control described above, a relationship between the pressure on the primary side and the pressure on the secondary side of the fluid resistance element in the specific flow path L1 matches or approaches the relationship in the bypass flow path L2. Hence, the diversion ratio S can easily be represented by a ratio between the number of resistance flow paths of the first fluid resistance element RE1 and the number of resistance flow paths of the second fluid resistance element RE2.

The diversion ratio S indicates, when the flow rate of the fluid F flowing through the main flow path L0 is assumed to be 1 (reference), the relative flow rate (S) of the first branch fluid F1 which is diverted to the specific flow path L1. Specifically, since the flow rate of the second branch fluid F2 diverted to the bypass flow path L2 is (1−S), the diversion ratio S is represented by S=S/{S+(1−S)}.

For example, when the aspect ratio of the resistance flow path is set constant, and the ratio between the number of resistance flow paths of the first fluid resistance element RE1 and the number of resistance flow paths of the second fluid resistance element RE2 is 1:10, a ratio between the flow rate flowing through the first fluid resistance element RE1 and the flow rate flowing through the second fluid resistance element RE2 is 1:10. Hence, the diversion ratio S is S=1/(1+10). The flow rate calculation unit 52 (in particular, the diversion ratio calculation unit 52*c*) calculates the diversion ratio S based on, for example, information previously stored in the storage unit 60 (here, the information of the number of resistance flow paths of the first fluid resistance element RE1 and the number of resistance flow paths of the second fluid resistance element RE2). In order to reduce an error in the diversion ratio caused by an error in the manufacturing of the fluid resistance element, it is preferable to previously determine an actual diversion ratio by actually causing the fluid to flow, and to correct a diversion ratio which is theoretically determined based on the number of resistance flow paths.

(S4; Step of Calculating Flow Rate of First Branch Fluid)

Then, the flow rate calculation unit 52 (in particular, the specific flow path measurement unit 52*a*) calculates the flow rate Q1 of the first branch fluid F1 diverted to the specific flow path L1 based on the RoR method, that is, based on a change in the pressure in the container TA. For example, it is assumed that during a time Δt (sec), the pressure in the container TA is increased by ΔP (Pa). In this case, the flow rate calculation unit 52 can calculate the flow rate Q1 by the RoR method based on formula (A) below.

$$Q1=(\Delta P/\Delta t)\times(V/RT)\times C \tag{A}$$

In formula (A), V represents the volume (L) of the container TA, T represents the gas temperature in the container TA detected by the temperature sensor or the temperature (K) of the outer wall or inner wall of the container TA, R represents a gas constant and C represents a correction coefficient. By multiplying by the correction coefficient C, conversion to a mass flow rate or a volume flow rate, change of a reference temperature and the like are performed. A compression coefficient which is a physical property value is also included in the correction coefficient C.

(S5; Step of Calculating Flow Rate of Fluid in Main Flow Path)

Then, the flow rate calculation unit 52 (in particular, the main flow path calculation unit 52*d*) calculates the flow rate Q of the fluid F flowing through the main flow path L0 based on the flow rate Q1 of the first branch fluid calculated in S4 and the diversion ratio S determined according to the first fluid resistance element RE1 and the second fluid resistance element RE2. Specifically, the flow rate calculation unit 52 can calculate the flow rate Q based on formula (B) below.

$$Q=Q1/S \tag{B}$$

(S6; Step of Diagnosing Flow Rate Control Device)

Finally, the device diagnosis unit 53 diagnoses the flow rate control device 100 based on the set flow rate Q0 when the flow rate control device 100 discharges the fluid F and the flow rate Q of the fluid F flowing through the main flow path L0 which is calculated by the flow rate calculation unit 52. For example, when a predetermined difference or more is generated between the set flow rate Q0 and the actual flow rate Q, the device diagnosis unit 53 can determine that the flow rate control device 100 encounters aging, clogging of the flow path, some failure or the like. In this case, the device diagnosis unit 53 outputs a control signal for calibrating the flow rate of the fluid discharged to the flow rate control device 100 to be able to property operate the flow rate control device 100.

As described above, the flow rate calculation unit 52 calculates the flow rate Q of the fluid F flowing through the main flow path L0 based on the calculated flow rate Q1 of the first branch fluid F1 and the diversion ratio S (S4 and S5). In this way, even when the flow rate of the fluid F is high, the container TA which is large enough to allow a part of the fluid F (first branch fluid F1) to flow thereinto is used, and thus it is possible to calculate the flow rate Q of the fluid F. Hence, when the flow rate Q is calculated, it is not necessary to prepare a large capacity container TA. Consequently, it is possible to calculate the flow rate Q of the fluid F flowing through the main flow path L0 while avoiding an increase in the size of the entire device.

In particular, the flow rate calculation unit 52 computes the flow rate Q based on formula (B) described above (S5). Even when the flow rate Q is high, formula (B) which specifies a relationship between the flow rate Q1, the diversion ratio S and the flow rate Q is utilized, and thus it is possible to reliably calculate the flow rate Q without causing an increase in the size of the container TA.

As described in S3, in order to control the control valve CV, the flow rate calculation unit 52 uses the ratio between the numbers of resistance flow paths to be able to easily set the diversion ratio S. It is easy to adjust the diversion ratio S by adjusting the numbers of resistance flow paths.

Each of the first fluid resistance element RE1 and the second fluid resistance element RE2 is the pressure loss element PL. In this way, a fluid resistance element such as a ceramic restrictor or an aperture can be used as the pressure loss element PL. A flow restrictor which is used in a differential pressure type mass flow controller can also be used as the pressure loss element PL.

Incidentally, the first fluid resistance element RE1 and the second fluid resistance element RE2 are preferably formed with the same type of element. For example, both the first fluid resistance element RE1 and the second fluid resistance element RE2 are preferably formed with a ceramic restrictor. Alternatively, both the first fluid resistance element RE1 and the second fluid resistance element RE2 are preferably formed with a flow restrictor. In this case, even when the pressure on the downstream side of the fluid resistance element is changed, the same pressure loss (energy loss) can be provided to the branch fluids in the specific flow path L1 and the bypass flow path L2. In this way, it is possible to reduce the possibility that the diversion ratio S is varied by a change in the pressure on the downstream side of the fluid resistance element. Consequently, it is possible to calculate, with stable accuracy, the flow rate Q in the main flow path L0 using the diversion ratio S.

[3. Another Configuration of Flow Rate Calculation Device]

Figure 6:
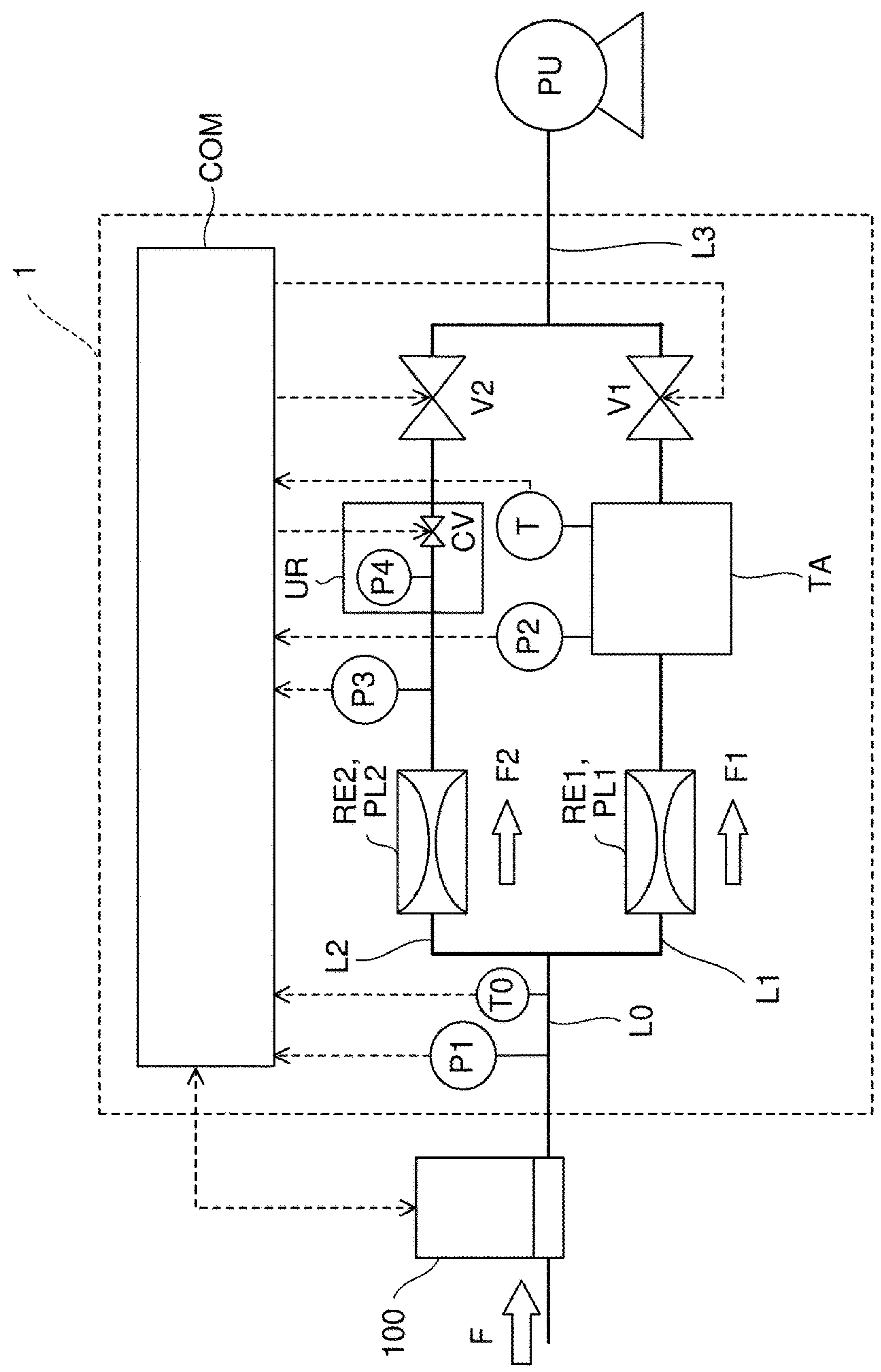
FIG. 6 is an illustrative view showing another configuration of the flow rate calculation device.

FIG. 6 is an illustrative view showing another configuration of the flow rate calculation device 1. The flow rate calculation device 1 in FIG. 6 has the same configuration as in FIG. 1 except that a pressure control device UR is arranged in the position of the control valve CV in FIG. 1. The pressure control device UR incorporates the control valve CV in FIG. 1 and a pressure gauge P4. The pressure control device UR as described above controls the control valve CV based on the detection value of the pressure gauge P4 to be able to control the flow rate of the fluid (the pressure of the fluid flowing through the flow path).

Even in the configuration of FIG. 6, the same pressure control as in S3 of FIG. 5 can be realized. Specifically, the flow rate calculation unit 52 controls the control valve CV in the pressure control device UR to be able to cause the pressure Pr3 on the downstream side of the second fluid resistance element RE2 to match or approach the pressure Pr2 in the container TA detected by the specific flow path pressure sensor P2. Consequently, it is possible to obtain the same effect as described above which facilitates the adjustment of the diversion ratio S. The pressure detection value of the pressure gauge P4 incorporated in the pressure control device UR is considered to be equal to the pressure Pr3.

In the configuration of FIG. 6, the control valve CV in the pressure control device UR is controlled, and thus the pressure is adjusted such that the pressure Pr3 on the downstream side of the second fluid resistance element RE2 matches or approaches the pressure Pr2 in the container TA detected by the specific flow path pressure sensor P2. However, a table or a relational formula may be set which previously acquires a relationship of the flow rates and the pressures between the main flow path pressure sensor P1 and the specific flow path pressure sensor P2 and between the main flow path pressure sensor P1 and the bypass flow path pressure sensor P3 in the branch flow paths. In this case, without controlling the control valve CV as described above (without provision of the control valve CV), it is possible to correct a difference between the pressure values of the branch flow paths to be able to achieve the same purpose.

[4. Another Configuration of Flow Rate Control Device]

Figure 7:
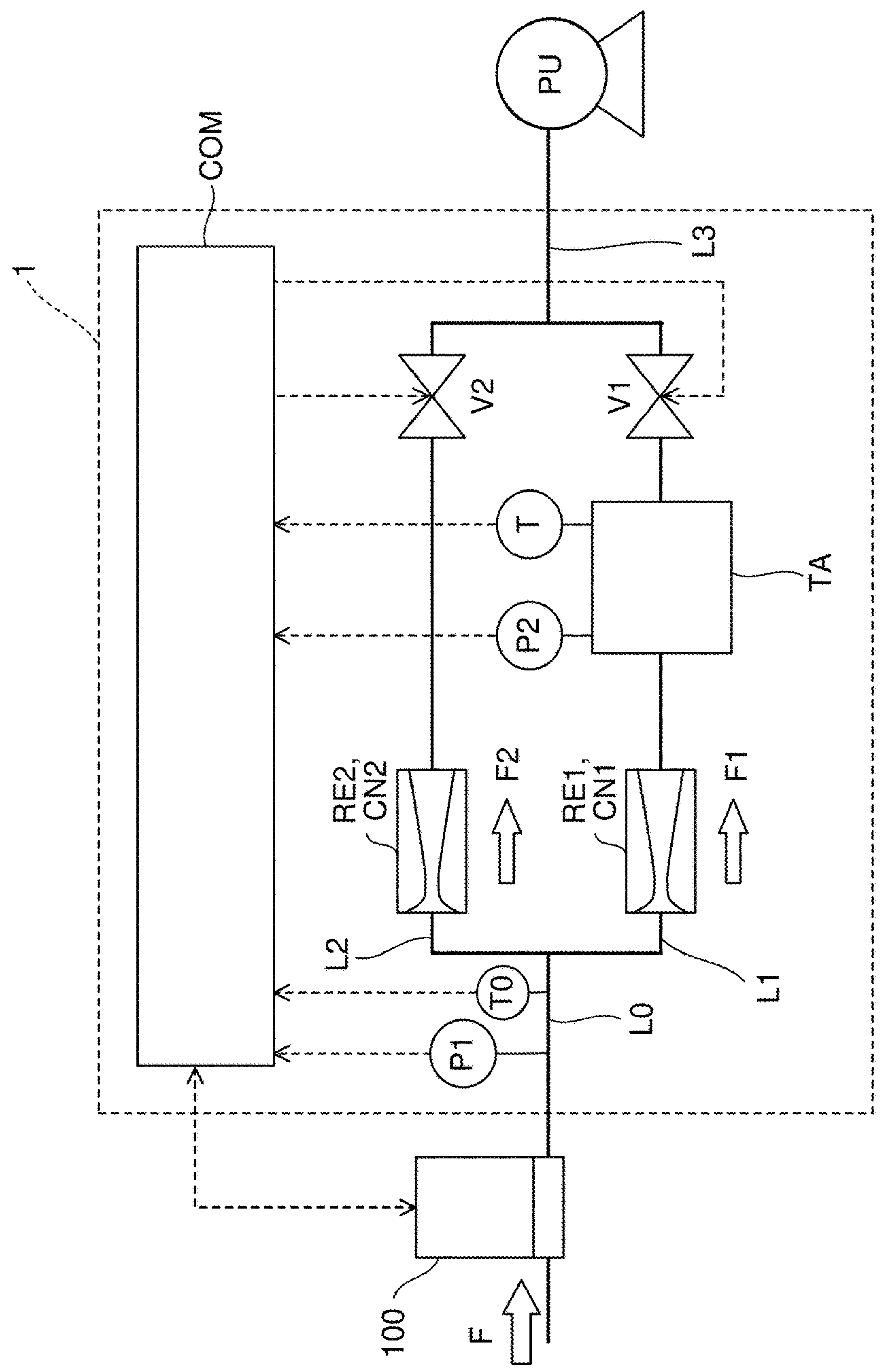
FIG. 7 is an illustrative view showing yet another configuration of the flow rate calculation device.

FIG. 7 is an illustrative view showing yet another configuration of the flow rate calculation device 1. The flow rate calculation device 1 in FIG. 7 has the same configuration as in FIG. 1 except that critical nozzles are used as the first fluid resistance element RE1 and the second fluid resistance element RE2, and the bypass flow path pressure sensor P3 and the control valve CV are removed. The flow rate calculation method is the same as the method shown in FIG. 5 except that the step S3 is deleted.

The first fluid resistance element RE1 is formed with a first critical nozzle CN1. The second fluid resistance element RE2 is formed with a second critical nozzle CN2. The first critical nozzle CN1 and the second critical nozzle CN2 may have exactly the same properties (the shape, the size and the smallest diameter) or may have different properties from each other.

The critical nozzle has the property that when a reduction in the pressure on the secondary side proceeds, and the flow velocity of the fluid flowing through the aperture (throat portion) of the critical nozzle reaches the velocity of sound (critical state), then no matter how much the pressure on the downstream side of the nozzle is reduced, the flow velocity of the fluid flowing through the throat portion does not exceed the velocity of sound and the flow velocity is fixed at the velocity of sound. Hence, when the critical nozzle is used, the flow rate of the fluid passing through the critical nozzle is determined depending on only the pressure on the primary side in the critical state (under the critical condition) regardless of the pressure on the secondary side of the critical nozzle. In other words, in the example of FIG. 7, the flow rate of the fluid passing through the critical nozzle is determined depending on the pressure Pr1 of the main flow path pressure sensor P1. Specifically, in the critical state, the flow rate of the fluid passing through the critical nozzle is calculated by mathematical formula 1 below.

$$q_t = A_t \cdot C_c \cdot P_s \sqrt{\frac{N_a}{R_u \cdot T_s}}$$ [Mathematical Formula 1]

In mathematical formula 1, qt is the theoretical value of the mass flow rate of the fluid (kg/s), Δt is the cross-sectional area of the throat portion of the critical nozzle ($m^2$), Cc is a critical constant, Ps is a stagnation point pressure (Pa) and Na is the molar mass of the fluid (kg/mol), Ru is a universal gas constant (J/K·mol) and Ts is a stagnation point temperature (K). The critical constant Cc is represented by mathematical formula 2 below where a specific heat ratio is κ.

$$C_c = \sqrt{K \cdot \left(\frac{2}{K+1}\right)^{\frac{K+1}{K-1}}}$$ [Mathematical Formula 2]

When the mass flow rate indicating the actual flow rate of the fluid is qm (kg/s), a discharge coefficient Cd is represented by mathematical formula 3 below.

$$C_d = \frac{q_m}{q_t} \quad \text{[Mathematical Formula 3]}$$

Hence, the stagnation point pressure Ps is measured with the main flow path pressure sensor P1, and thus the theoretical value qt of the mass flow rate is calculated from mathematical formula 1 and mathematical formula 2 on the assumption that the other parameters are known, and the theoretical value qt is multiplied by the discharge coefficient Cd in mathematical formula 3, and thus the actual flow rate (mass flow rate qm) of the critical nozzle can be determined.

On the other hand, in mathematical formula 1 described above, the parameters other than Ps (stagnation point pressure) are the characteristic values of the critical nozzle and the physical property values of the fluid (gas). Hence, when Ps is the same in various gases which are caused to flow, even if the flow rate itself of each of the gases flowing through the critical nozzle is not found, the ratio of the flow rates of the gases flowing through the critical nozzles is found. Therefore, when the critical nozzles are used, the ratio of the flow rates is used, and thus it is possible to determine the diversion ratio S. For example, when the ratio of the flow rates of the fluid flowing through the first critical nozzle CN1 and the fluid flowing through the second critical nozzle CN2 is m:n, the diversion ratio S is represented by S=m/(m+n).

Hence, when the first fluid resistance element RE1 is formed with the first critical nozzle CN1, and the second fluid resistance element RE2 is formed with the second critical nozzle CN2, it is not necessary to perform the step S3 in FIG. 5 in order to determine the diversion ratio S. In other words, the diversion ratio S can be acquired even when the control for causing the pressure on the downstream side of the second fluid resistance element RE2 to match the pressure in the container TA is not performed. Therefore, it is not necessary to provide the bypass flow path pressure sensor P3 and the control valve CV in the bypass flow path L2 in order to acquire the diversion ratio S. Consequently, with a simpler configuration than FIG. 1 and a simple method, it is possible to calculate the flow rate Q of the fluid F.

5. Supplemental Information

When in the configuration shown in FIG. 1 and the like, the first opening/closing valve V1 on the downstream side of the container TA is closed, the pressure Pr2 in the container TA is increased. It is considered that the pressure Pr1 detected by the main flow path pressure sensor P1 on the upstream side is increased accordingly. A correction for adding a flow rate ΔQ calculated when the pressure in the main flow path L0 on the upstream side is increased to the flow rate Q calculated when the pressure in the specific flow path L1 is increased is performed, and thus it is possible to more accurately calculate the flow rate Q' (=Q+ΔQ) of the flow rate control device 100. The flow rate ΔQ described above can be indicated by the volume of the flow paths connecting the flow rate control device 100 and the two fluid resistance elements (the first fluid resistance element RE1 and the second fluid resistance element RE2). The volume described above can be acquired by determining V in formula (A) described previously with P=Pr1.

6. Programs

The control computation device COM of the flow rate calculation device 1 according to the present embodiment can be formed with a computer in which the operation programs (application software) are installed. The programs described above are read and executed by the computer (for example, the control unit 50), and thus the units of the control unit 50 (the main control unit 51, the flow rate calculation unit 52 and the device diagnosis unit 53) can be operated to perform the processing (steps) described above. For example, the programs as described above are acquired by being downloaded from the outside via a network and are stored in the memory (storage unit 60). The programs may be recorded in a computer-readable recording medium such as a CD-ROM (Compact Disk-Read Only Memory), and the programs may be read from the recording medium to be stored in the memory. In other words, the flow rate calculation programs in the present embodiment are programs for causing the computer to perform the steps in the flow rate calculation method according to the present embodiment. The recording medium in the present embodiment is a computer-readable recording medium in which the flow rate calculation programs are recorded.

As described above, according to the present invention, it is possible to calculate, even when the flow rate of a fluid is high, the flow rate of the fluid while avoiding an increase in the size of the entire device.

Although the embodiment of the present invention has been described above, the scope of the present invention is not limited to the embodiment described above, and an extension or a change can be made and implemented without departing from the spirit of the invention.

The present invention can be utilized for a system which inspects or diagnoses a flow rate control device such as a mass flow controller.

What is claimed is:

1. A flow rate calculation device that calculates a flow rate of a fluid flowing through a main flow path, the flow rate calculation device comprising:
- a specific flow path and a bypass flow path
  - which are provided to branch from the main flow path and
  - to which the fluid is diverted;
- a first fluid resistance element that is provided in the specific flow path;
- a second fluid resistance element that is provided in the bypass flow path;
- a container that is arranged on a downstream side of the first fluid resistance element in the specific flow path;
- a pressure sensor that detects a pressure in the container; and
- a flow rate calculation unit that
  - calculates a flow rate of a first branch fluid diverted to the specific flow path based on a change in the pressure in the container, and
  - calculates the flow rate of the fluid flowing through the main flow path based on the calculated flow rate of the first branch fluid and a diversion ratio determined according to the first fluid resistance element and the second fluid resistance element.

2. The flow rate calculation device according to claim 1, wherein when the pressure sensor is a specific flow path pressure sensor, the flow rate calculation device further includes:

a bypass flow path pressure sensor that is arranged on a downstream side of the second fluid resistance element in the bypass flow path; and a control valve that controls a flow rate of a second branch fluid flowing through the bypass flow path via the second fluid resistance element, and the flow rate calculation unit controls the control valve such that a pressure on the downstream side of the second fluid resistance element which is measured by the bypass flow path pressure sensor matches or approaches the pressure in the container which is detected by the specific flow path pressure sensor.

3. The flow rate calculation device according to claim 2, further comprising:

a pressure control device that incorporates the control valve and a pressure gauge, wherein the flow rate calculation unit controls the control valve of the pressure control device.

4. The flow rate calculation device according to claim 2, wherein the first fluid resistance element and the second fluid resistance element are pressure loss elements that provide pressure losses to the first branch fluid and the second branch fluid, respectively.

5. The flow rate calculation device according to claim 4, wherein the pressure loss elements of the first fluid resistance element and the second fluid resistance element are restrictors formed of ceramics.

6. The flow rate calculation device according to claim 4, wherein the pressure loss elements of the first fluid resistance element and the second fluid resistance element are restrictors formed of metal.

7. The flow rate calculation device according to claim 1, wherein the first fluid resistance element and the second fluid resistance element are critical nozzles.

8. The flow rate calculation device according to claim 7, further comprising:

a main flow path pressure detection unit that is arranged in the main flow path, wherein under a critical condition where a flow velocity of each of fluids flowing through the critical nozzles of the first fluid resistance element and the second fluid resistance element is a velocity of sound, a ratio of flow rates of the fluids flowing through the critical nozzles is calculated using a pressure detected by the main flow path pressure detection unit, and the flow rate calculation unit determines the diversion ratio based on the ratio of the flow rates.

9. The flow rate calculation device according to claim 1, further comprising:

a device diagnosis unit that diagnoses a flow rate control device which discharges the fluid into the main flow path, wherein the device diagnosis unit diagnoses the flow rate control device based on a set flow rate when the flow rate control device discharges the fluid and the flow rate of the fluid flowing through the main flow path calculated by the flow rate calculation unit.

10. The flow rate calculation device according to claim 1, wherein the flow rate calculation unit uses a formula below to calculate the flow rate Q of the fluid flowing through the main flow path:

$$Q = Q1/S$$

where the diversion ratio is S, and the calculated flow rate of the first branch fluid is Q1.

11. A flow rate calculation method comprising:

a step of calculating, when a fluid flowing through a main flow path is diverted to a specific flow path and a bypass flow path that are provided to branch from the main flow path, a flow rate of a first branch fluid flowing through the specific flow path based on a change in a pressure in a container arranged on a downstream side of a first fluid resistance element in the specific flow path; and a step of calculating a flow rate of the fluid flowing through the main flow path based on the calculated flow rate of the first branch fluid and a diversion ratio determined according to the first fluid resistance element and a second fluid resistance element provided in the bypass flow path.

* * * * *